(12) United States Patent
Podlipskiy

(10) Patent No.: US 9,884,997 B2
(45) Date of Patent: Feb. 6, 2018

(54) OIL FROM OIL SANDS EXTRACTION PROCESS

(71) Applicant: Vladimir Y. Podlipskiy, San Diego, CA (US)

(72) Inventor: Vladimir Y. Podlipskiy, San Diego, CA (US)

(73) Assignee: MCW ENERGY GROUP LIMITED, New Brunswick (CA)

( * ) Notice: Subject to any disclaimer, the term of this patent is extended or adjusted under 35 U.S.C. 154(b) by 914 days.

(21) Appl. No.: 13/627,518

(22) Filed: Sep. 26, 2012

(65) Prior Publication Data

US 2013/0256092 A1 Oct. 3, 2013

Related U.S. Application Data

(60) Provisional application No. 61/545,034, filed on Oct. 7, 2011.

(30) Foreign Application Priority Data

Sep. 30, 2011 (CA) ...................................... 2754355

(51) Int. Cl.
*C10G 1/04* (2006.01)
*B01D 11/02* (2006.01)
*B01D 11/00* (2006.01)

(52) U.S. Cl.
CPC .......... *C10G 1/045* (2013.01); *B01D 11/0257* (2013.01); *B01D 2011/002* (2013.01)

(58) Field of Classification Search
CPC ...... C10G 1/04; C10G 1/045; B01D 11/0257; B01D 2011/002
See application file for complete search history.

(56) References Cited

U.S. PATENT DOCUMENTS 4,092,338 A * 5/1978 Tossey ...................... C02F 3/28
210/142
4,110,194 A * 8/1978 Peterson ................ C10G 1/047
196/14.52

(Continued)

FOREIGN PATENT DOCUMENTS

EP 0081016 A1 6/1983
EP 0086576 A1 8/1983

(Continued)

*Primary Examiner* — Jonathan Miller
(74) *Attorney, Agent, or Firm* — Nydegger & Associates

(57) ABSTRACT

A system for extracting bitumen from oil sands includes an extractor tank having a reaction chamber. An input port is provided at the upper end of the extractor tank for the purpose of introducing oil sand into the reaction chamber. A liquid extractant is heated and then pumped, under pressure, into the reaction chamber through a plurality of jet inlets to suspend the oil sand in the extractant, as a fluidized bed inside the reaction chamber. After reactions, an extract that contains both extractant (solvent) and bitumen, is separated from the sand. A vibratory centrifuge is connected to an outflow port of the extractor tank to receive the sand and remove any residual extractant from the sand. An evaporator and distillation column are provided to remove the extract from the reaction chamber and separate the extractant from the bitumen.

13 Claims, 3 Drawing Sheets

(56) References Cited

U.S. PATENT DOCUMENTS

| | | | | |
|---|---|---|---|---|
| 4,160,718 A | * | 7/1979 | Rendall | C10G 1/04 196/14.52 |
| 4,424,112 A | * | 1/1984 | Rendall | C10G 1/047 208/390 |
| 4,532,024 A | * | 7/1985 | Haschke | C10G 1/04 203/68 |
| 4,719,008 A | * | 1/1988 | Sparks | C10G 1/04 208/390 |
| 4,737,267 A | * | 4/1988 | Pao | C10G 1/002 208/424 |
| 5,409,610 A | * | 4/1995 | Clark | C02F 1/006 210/179 |
| 5,534,136 A | * | 7/1996 | Rosenbloom | C10G 1/04 196/14.52 |
| 6,527,960 B1 | | 4/2003 | Bacon et al. | |
| 7,008,528 B2 | * | 3/2006 | Mitchell | B01D 11/0203 134/40 |
| 7,588,682 B2 | * | 9/2009 | Norman | C10G 33/06 208/390 |
| 7,694,829 B2 | * | 4/2010 | Veltri | C10G 1/047 210/521 |
| 8,858,786 B2 | * | 10/2014 | Wu | C10G 1/045 208/390 |
| 9,023,197 B2 | * | 5/2015 | Kift | C10G 1/04 208/323 |
| 2009/0020456 A1 | | 1/2009 | Tsangaris et al. | |
| 2009/0294332 A1 | * | 12/2009 | Ryu | C10G 1/04 208/390 |
| 2009/0305933 A1 | | 12/2009 | Stokes et al. | |
| 2013/0056395 A1 | * | 3/2013 | Pierre, Jr. | C10G 1/002 208/390 |
| 2013/0233772 A1 | * | 9/2013 | Jordan | C10G 1/045 208/390 |

FOREIGN PATENT DOCUMENTS

| | | |
|---|---|---|
| EP | 0372761 A2 | 6/1990 |
| EP | 2243546 A1 | 10/2010 |

* cited by examiner

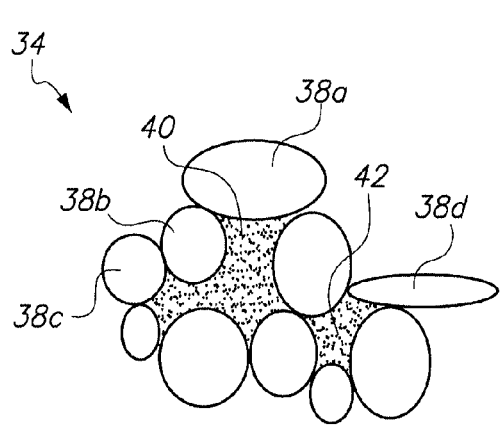
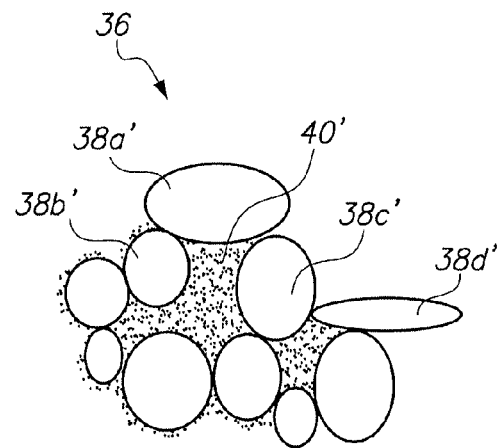
FIG. 3A
FIG. 3B
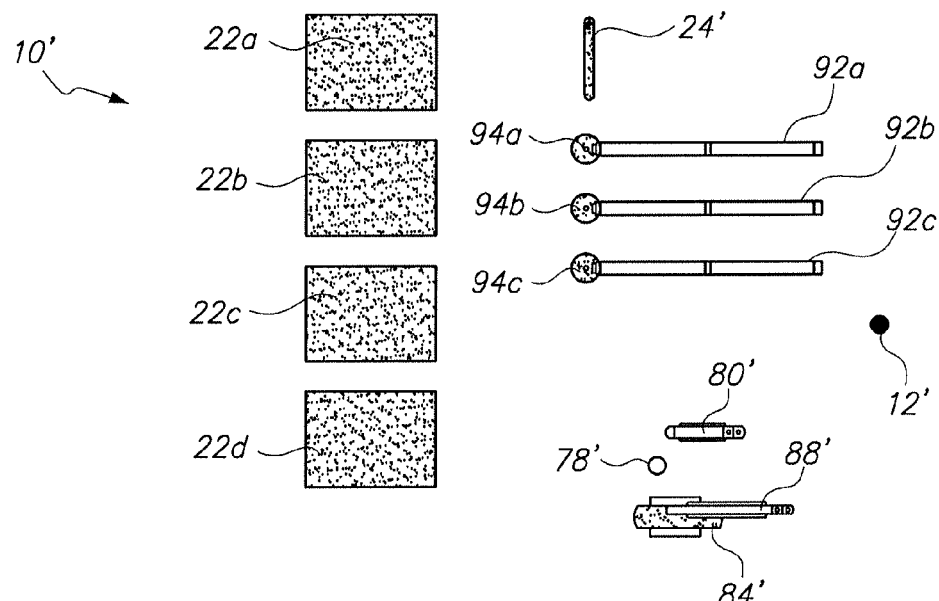
FIG. 4

OIL FROM OIL SANDS EXTRACTION PROCESS

This application claims the benefit of U.S. Provisional Patent Application Ser. No. 61/545,034, filed Oct. 7, 2011. This application also claims the benefit of Canadian Patent Application No. 2,754,355, filed Sep. 30, 2011. The contents of U.S. Provisional Patent Application Ser. No. 61/545,034 and Canadian Patent Application No. 2,754,355 are incorporated herein by reference.

FIELD OF THE INVENTION

The present invention pertains generally to systems and methods for extracting bitumen from oil sands. More particularly, the present invention pertains to the extraction of bitumen from oil sands using a liquid solvent with additives. The present invention is particularly, but not exclusively, useful as a system and method for extracting bitumen from either water wet or oil wet oil sands in a commercially viable manner.

BACKGROUND OF THE INVENTION

As the worldwide demand for fossil fuels continues to increase, new, unconventional sources for fossil fuels must be developed because traditional sources are rapidly diminishing. One promising source is oil sand which is found in significant quantities in several parts of the world, most notably Canada and the state of Utah and most of the United States oil sands reserves are in the state of Utah. Oil sands contain naturally occurring mixtures of sand, clay, water, and bitumen. Because of this composition, oil sands cannot be extracted in the same manner as oil in an oil field. Instead, if the oil sands are not accessible using traditional mining methods, the oil sands are either mined and processed for the oil extraction or oil is extracted without mining using specialized techniques. In the event, a particular specialized technique will be chosen based on the composition of the oil sand being extracted and the depth and saturation of the oil sands deposit. Stated differently, every oil sand deposit cannot be extracted using a single, common method.

An important consideration when attempting to extract oil sands is the wettability of the rock or sand where an oil sand deposit is situated. There are basically two types of wettability that are encountered when dealing with oil sands. They are water wet and oil wet. In the water wet condition, a thin film of water coats the surface of the bitumen contained within the oil sand. Various techniques have been effective with water wet oil sands for extracting bitumen. One such effective technique is a conventional hot water process where the hot water washes bitumen from the oil sand and replaces it with water. Techniques for recovering bitumen from oil wet oil sands, however, have been more problematic.

In the oil wet condition, the material surrounding the bitumen is in direct contact with bitumen. This condition is much more difficult from an extraction standpoint because the traditional hot water process is not as effective. On this point, various extraction methods for oil wet oil sands have been attempted using heat, ultrasonic waves, and microwaves, but none have been commercially successful. In addition, various types of solvents have also not been successful for this purpose. Furthermore, no commercially viable method has been developed that can extract bitumen equally well from either water wet or from oil wet oil sands.

In light of the above, it is an object of the present invention to extract bitumen from oil sands in a commercially viable manner. Another object of the present invention is to develop a liquid solvent that, along with an additive, can be used to effectively extract bitumen from both water wet and oil wet oil sands. Still another object of the present invention is to use a solvent to create a fluidized bed that can facilitate the separation of bitumen from oil sand. It is another object of the present invention to provide an oil sand extraction system and method that are relatively easy to implement, cost effective and simple to use.

SUMMARY OF THE INVENTION

In accordance with the present invention, a system for extracting bitumen from oil sands includes an extractor tank having a reaction chamber. An input port is provided at the upper end of the extractor tank for the purpose of introducing oil sand into the reaction chamber. As envisioned for the present invention, the oil sand can be either so-called "oil wet" sand, or "water wet" sand. Further, the present invention also envisions that the oil sand includes a medium (matrix) holding the bitumen, and that the medium (matrix) may be either sand, clay, shale, coal, or any other type of insoluble solid material.

A source of a liquid extractant (i.e. a solvent) is provided in the system for reaction with the oil sand in the reaction chamber. Specifically, this extractant is heated to about 60° C. and it is then pumped through jet injectors into the reaction chamber to establish a spiral velocity of extractant in the reaction chamber. More specifically, the extractant is injected into the reaction chamber through a plurality of jet inlets that are strategically positioned around the lower end of the extractor tank. Importantly, these jet inlets are positioned to direct extractant into the tank in order to suspend the oil sand in the extractant, as a fluidized bed inside the reaction chamber. A reaction of the extractant (i.e. solvent) with the oil sand then occurs in this fluidized bed. The result of this reaction is that an extract that contains both extractant (solvent) and bitumen, is separated from the sand. A computer with a computer program can be provided for controlling the plurality of jet injectors to maintain a predetermined level for the fluidized bed in the chamber.

At the lower end of the extractor tank, an outflow port is provided for removing sand from the reaction chamber after the extractant and oil sand have reacted with each other. In anticipation of there being residual extractant in the sand that is removed from the reaction chamber, an optional vibratory centrifuge can be connected to the outflow port of the extractor tank to receive the sand. The vibratory centrifuge is then used to remove residual extractant from the sand. Pressurized membrane filters and/or other types of liquid/solid separation equipment can be used to separate residual solvent from clean sand. A device employing fluidized bed technology may also be incorporated with the vibratory centrifuge for this purpose. The recovered extractant can then be returned to the source of liquid extractant for further use in the system. On the other hand, the sand can be taken from the system for commercial use.

At the upper end of the extractor tank, an evaporator is connected in fluid communication with the reaction chamber. The purpose of this evaporator is actually two-fold. For one, it removes extract from the reaction chamber after there has been a reaction between the extractant and the oil sand. For another, it is used to evaporate extractant (solvent) from the extract, and thereby create a solvent vapor. To do this, a heater generates steam for heating the evaporator to a temperature above 100° C. Additionally, there is a distillation column that is connected to the evaporator for separating this solvent vapor from the bitumen that was in the extract. The solvent vapor is then condensed back into liquid extractant (solvent) and returned to the source of liquid extractant for subsequent use in the system. On the other hand, the bitumen is recovered for further commercial use.

A crucial element of the present invention is the extractant itself. In detail, the extractant necessarily includes a liquid hydrophobic component, and a liquid hydrophilic component. Importantly, these components are combined to create an azeotropic composition that is useful for dissolving and extracting bitumen from an oil sand. As noted above, the oil sand may be either an "oil wet" sand or a "water wet" sand. Further, the extractant will include an additive that is added to the azeotropic composition to prevent precipitation of the bitumen from the extractant during the reaction between the extractant and the oil sand in the reaction chamber. Preferably, the additive will be a solid aromatic compound, and will be either a two-cyclic compound or a three-cyclic compound. Also, the additive will preferably act as a catalyst to increase the speed of extraction of the bitumen from the oil sand.

As mentioned above, the hydrophobic component and the hydrophilic component of the extractant are combined (mixed) to create an azeotropic composition having a boiling point of approximately 65° C. To achieve this, the boiling point of the hydrophobic component can be less than 60° C., with the appreciation that the boiling point of the hydrophilic component will still be preferably less than about 80° C.

Preferably, the hydrophobic component is selected from a group including straight hydrocarbons and branched hydrocarbons, and the hydrophilic component is selected from a group including alcohols, esters and ketones.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3A is an internal view of the component structure of water wet oil sand;

FIG. 3B is an internal view of the component structure of oil wet oil sand; and

FIG. 4 is a proposed plant layout for a system for extracting bitumen from oil sands.

DESCRIPTION OF THE PREFERRED EMBODIMENTS

Figure 1:
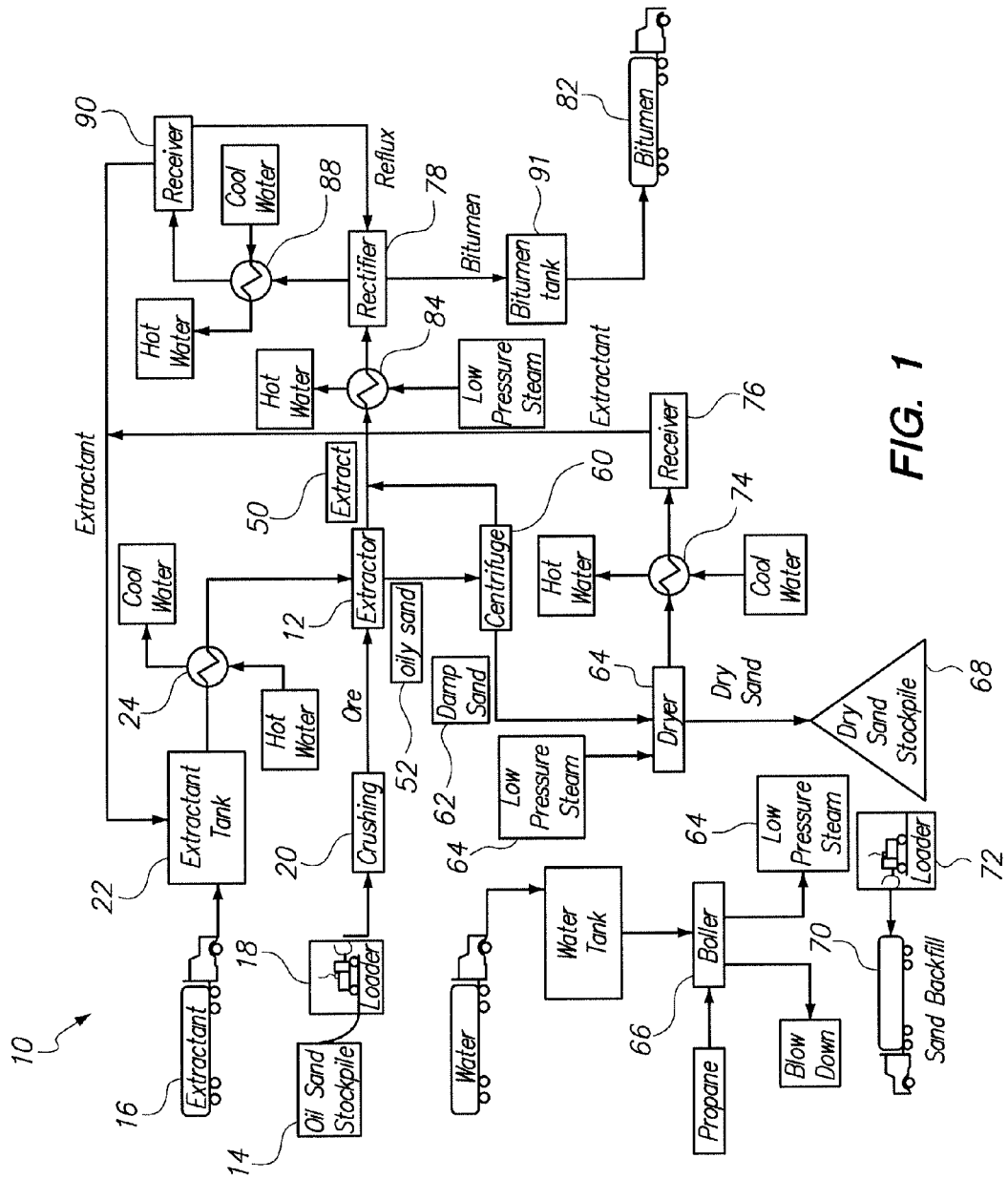
FIG. 1 is a schematic drawing of a system for extracting bitumen from oil sands in accordance with the present invention.

With initial reference to FIG. 1, a system for extracting bitumen from oil sands in accordance with the present invention is shown and generally designated 10. As shown, the system 10 includes an extractor 12 for processing oil sands 14 using an extractant 16. For the system 10, the oil sand 14 can be stockpiled using traditional methods and fed using loader 18 into conventional milling machinery 20 to crush the oil sand 14 and produce an ore that is suitable for feeding into the extractor 12. In some cases, the oil sand 14 can be pre-mixed with extractant 16 in a mixing vessel (See FIG. 4) prior to introducing the oil sand 14 into the extractor 12.

Continuing with FIG. 1, it can be seen that the extractant 16 can be loaded into an on-site extractant tank 22 for storage. When needed, extractant 16 from tank 22 is then heated to a suitable temperature using heater 24 and injected under pressure into extractor 12.

Figure 2:
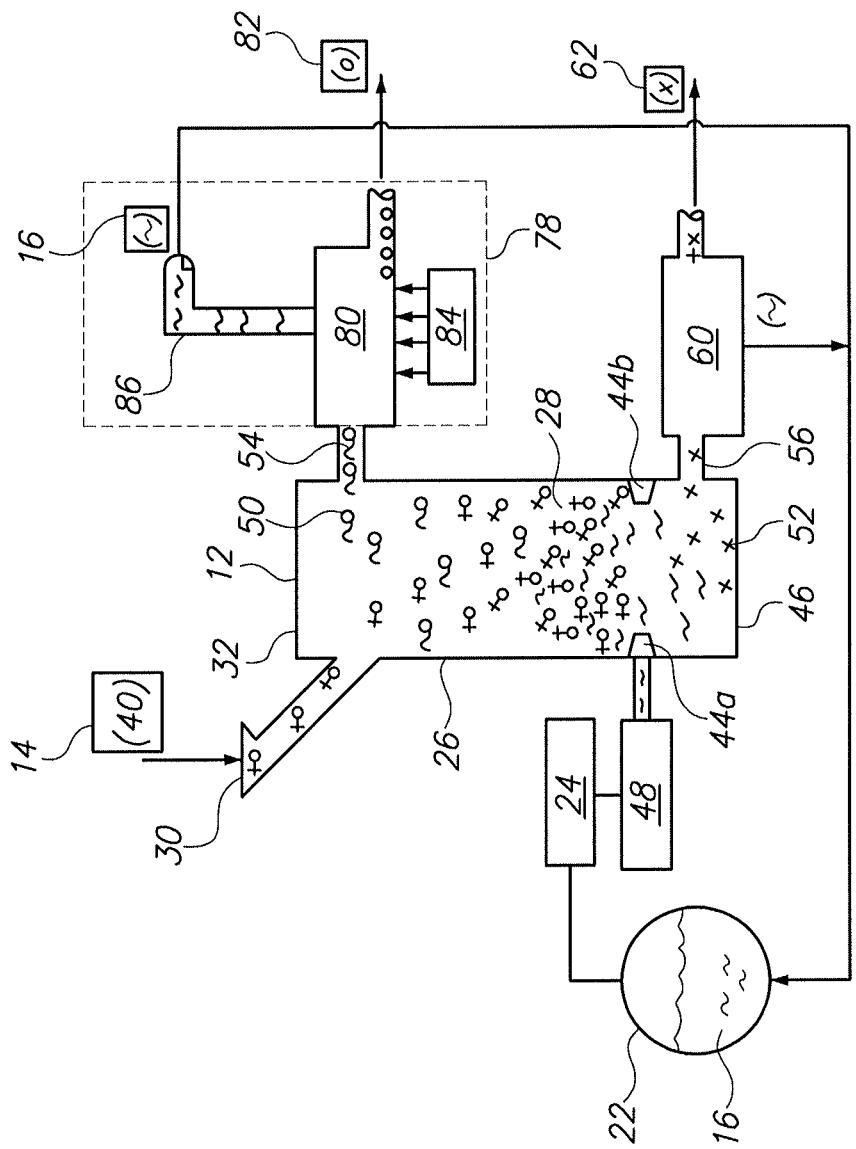
FIG. 2 is a schematic drawing showing the cycle of the reactions and transformations that are involved in the process of extracting bitumen from an oil sand in accordance with the present invention.

FIG. 2 illustrates a process flow for an embodiment of an extractor 12 having an extractor tank 26 that establishes a reaction chamber 28. As further shown, an input port 30 is provided at or near the upper end 32 of the extractor tank 26 for the purpose of introducing oil sand 14 (shown with the symbol +o) into the reaction chamber 28. For the present invention, the oil sand can include, but is not necessarily limited to, "water wet" sands 34 (as shown in FIG. 3A) and "oil wet" sands 36 as shown in FIG. 3B. As shown in FIG. 3A, for water wet sands 34, sand particles 38$a$-$d$ establish interstitial pores 40 which include bitumen. As further shown a layer of water 42 overlays and wets the sand particles 38$a$-$d$, separating the bitumen from the sand particles 38$a$-$d$. On the other hand, for oil wet sands 36 (FIG. 3B), sand particles 38$a'$-$d'$ establish interstitial pores 40' which include bitumen which overlays and wets the sand particles 38$a'$-$d'$.

Referring back to FIGS. 1 and 2, it is shown that the extractant 16 (shown with the symbol ~) is injected into the reaction chamber 28 through a plurality of inlets 44$a$,$b$ that are strategically positioned around the lower end 46 of the extractor tank 26. More specifically, as shown in FIG. 2, liquid extractant 16 (i.e. a solvent) is heated to a temperature near its boiling point by heater 24 and then pumped through jet injectors into the reaction chamber 28 by pump 48 to establish a spiral velocity of extractant 16 in the reaction chamber 28. Typically, the extractant 16 is heated to within about 10 percent of its boiling point (measured in Celsius) prior to injection into the reaction chamber 28. Moreover, for the extractor 12, the inlets 44$a$,$b$ are positioned to direct extractant into the tank in order to suspend the oil sand 14 in the extractant 16, as a fluidized bed inside the reaction chamber 28. A reaction of the extractant 16 with the oil sand 14 then occurs in this fluidized bed which results in an extract 50 (shown with the symbol ~0) that contains both extractant 16 and bitumen that has separated from the sand 52 (shown with the symbol x). As shown, the extract 50 exits the reaction chamber 28 at an outflow port 54 near the upper end 32 of the extractor tank 26 and the sand 52 exits the reaction chamber 28 at an outflow port 56 near the lower end 46 of the extractor tank 26.

FIG. 2 shows that any residual extractant 16 can be separated from the sand 52 that exits the reaction chamber 28 by an optional vibratory centrifuge 60 that receives the oily sand from the outflow port 56. A device (not shown) employing fluidized bed technology may also be incorporated with the vibratory centrifuge 60 for this purpose. In some cases, a dryer can be used in place of the vibratory centrifuge. As further shown in FIGS. 1 and 2, the outputs of the vibratory centrifuge 60 include extractant 16 that can be recycled into tank 22 and damp sand 62. FIG. 1 shows that the damp sand 62 can be fed into a dryer 64, that is heated, for example, using low pressure steam 64 generated by a boiler 66. Once dried, the sand can then be stored in a dry sand stockpile 68 until loaded onto a truck 70 using loader 72 and transported for use as sand backfill. Extractant 16 recovered from the dryer 64 can be cooled at heat exchanger 74, stored in a receiver tank 76 and recycled back into the extractant tank 22, as shown in FIG. 1.

As best seen in FIG. 2, a rectifier 78 having an evaporator 80 is connected to outflow port 54 to establish fluid communication between the evaporator 80 and with the reaction chamber 28. During the reaction process, extract 50 is forced upwardly in the reaction chamber 28, exits through the outflow port 54 and enters the evaporator 80. Functionally, the evaporator 80 separates the extract 50 into extractant 16 (solvent) and bitumen 82 (shown with the symbol 0). To do this, the evaporator 80 heats and evaporates the extract, and thereby creates a solvent vapor. As shown, a heater 84 such as a tube and shell heat exchange can use steam to heat the extract 50 in the evaporator 80 to a temperature above 100° C. Additionally, as shown, the rectifier 78 can include a distillation column 86 can be connected to the evaporator 80 for separating the extractant 16 from the bitumen 82 that was in the extract 50. FIG. 1 then shows that the extractant 16 vapor from the rectifier 78 can be cooled at heat exchanger 88, condensed at receiver 90 and recycled into tank 22 for subsequent use in the system 10. From the rectifier 78, the bitumen 82 can be stored in a bitumen tank 91 for subsequent transportation to a downstream processing facility (not shown).

For the system 10, the conditions inside the extractor 12 are optimized to maximize mixing and reaction between the extractant 16. Specifically, these conditions include the composition and temperature of the extractant 16 and the flows rates and paths of the various species in the reaction chamber 28. These flow rates and paths, in turn, are a function of a number of factors including the number of injection ports, the injection pressures and flows, and the size and shape of the reaction chamber including any flow directors (i.e. flow guides).

Typically, it is preferable to use an extractant having a relatively low boiling point, e.g. under 80 degrees C., to reduce the operating temperature of the system 10 and associated heat losses. In addition, as described above, it may be desirable to heat the extractant 16 to a temperature very neat the boiling point of the extractant 16, to increase rate of reaction between the extractant 16 and the oil sand 14.

In most cases, the extractant 16 will include a liquid hydrophobic component, a liquid hydrophilic component and an additive. This will allow the extractant 16 to wet both oil and water components in the oil sand 14. Moreover, in some cases, a low boiling point, multi-component extractant can be produced have a boiling point that is lower than two or more of the components (i.e. $T_{BP,\ extractant} < T_{BP,\ component\ 1} < T_{BP,\ component\ 2}$. For example, an azeotropic composition of two or more components may be used.

For a typical composition, approximately 65-80% of the extractant 16 by volume is the hydrophobic component and approximately 20-35% of the extractant 16 by volume is the hydrophilic component. And the additive is in a range of approximately 0.1% to 1.0% of the extractant 16 by volume. Preferably, the hydrophobic component is selected from a group including straight hydrocarbons and branched hydrocarbons, and the hydrophilic component is selected from a group including alcohols, esters and ketones.

The hydrophobic ingredients can include Pentane, isopentane, hexane, iso-hexane, methyl hexane. (i.e. components of petroleum ether). Other hydrophobic solvents include tetrahydrofurane, methylenechloride, chloroform, and/or carbon tetrachloride.

For example, the liquid hydrophobic component can include petroleum ether. A typical composition of petroleum ether is 50% methylpentan, 30% hexane, and 20% methylhexane. In some instances, the hydrophobic component can include chloroform and/or carbon tetrachloride and/or methylene chloride, for example in concentrations of about 10% and/or about 10% tetrahydrofurane.

As an example, the liquid hydrophilic component can include methyl acetate, methanol and/or benzyl alcohol. Typically, the quantity of benzyl alcohol used in the extractant 16 is less than about 1%.

The composition is often adjusted based on the water content of the oil sand 14. For example, a typical composition for high water content sands (i.e. greater than about 2% water) includes about 70% hydrophobic component, about 15% methyl acetate, about 14% methanol and about 1% additive. On the other hand, a typical composition for low water content sands (i.e. less than about 2% water) includes about 80% hydrophobic component, about 15% methyl acetate, about 4% methanol and about 1% additive.

For the extractant 16, the additive is a two-cyclic or three-cyclic aromatic compound such as biphenyl, 2,2' dimethylbiphenyl, diphenyl ether, naphthalene, dimethylnaphtalene, benzofuran, 1-naphtol, acenaphtene, antracene or a combination thereof. For the system 10, the extractant 16 typically includes one or more additives that are added to the composition to prevent or reduce precipitation of the bitumen from the extractant 16 during the reaction between the extractant and the oil sand 14 in the reaction chamber 28. Also, the additive will preferably act as a catalyst to increase the speed of extraction of the bitumen 82 from the oil sand 14.

To prepare the extractant 16, the hydrophobic ingredients are first added to the mixing tank with stirring blades and mixed for 30 minutes. Then, the hydrophilic components are added and mixed, stirring for another 15 minutes. The aromatic additives are then added and mixed for about an hour until evenly dissolved.

FIG. 4 shows a proposed plant layout for a system 10' for extracting bitumen from oil sands. As shown, the system 10' can include four extractant tanks 22a-d. The extractant is preheated in heater 24'. Conveyers 92a-c deliver oil sand into three pre-mixing vessels 94a-c where the oil sand is pre-mixed with extractant. The layout also includes an extractor 12' as shown. The pre-mixed extractant/oil sand can be feed, e.g. using gravity feed into the top of the extractor 12'. The layout further includes a rectification column 78' (as described above), an evaporator 80' (as described above), a cooler/heat exchanger 88' (as described above) and a heater 84' (as described above).

While the particular Oil Extraction Process as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for extracting bitumen from oil sands which comprises:
   a means for crushing the oil sands;
   an extractor tank having an upper end and a lower end, wherein the extractor tank includes a reaction chamber;
   an input port located at the upper end of the extractor tank for introducing an input consisting of the crushed oil sand directly into the reaction chamber, wherein the crushed oil sand contains bitumen and sand;

a plurality of jet injectors positioned at predetermined locations around the lower end of the extractor tank;

a source of a liquid extractant connected to the extractor tank, wherein the liquid extractant includes a solvent;

a pump connected to the extractor tank for pressurizing and moving the liquid extractant from its source and through the plurality of jet injectors around the lower end of the extractor tank for directing the extractant into the reaction chamber as jet streams of extractant having a spiral velocity in the extractor tank, to create a fluidized bed for suspending the crushed oil sand in the reaction chamber between the jet injectors and the input port, where a reaction of the oil sand with the extractant in the fluidized bed separates an extract from the sand, and the extract includes solvent and bitumen;

an outflow port located at the lower end of the extractor tank for removing sand from the reaction chamber;

a separating means connected with the lower outflow port of the extractor tank to receive sand from the extractor tank and remove residual extractant from the sand;

an evaporator connected to the extractor tank for receiving the extract from the reaction chamber, and for evaporating solvent from the extract; and a distillation column connected to the evaporator for separating the solvent vapor from the bitumen.

2. A system as recited in claim 1 wherein the separating means comprises a vibratory centrifuge and a device connected with the vibratory centrifuge to create a fluidized bed of the sand to facilitate removal of the residual extractant from the sand.

3. A system as recited in claim 1 wherein the extractant includes an additive to prevent precipitation of bitumen from the extract, and to increase the speed of extraction of the bitumen from the oil sand.

4. A system as recited in claim 1 further comprising a conduit for moving the residual extractant to the source of liquid extractant.

5. A system as recited in claim 1 further comprising a heater connected between the source of liquid extractant and the pump for heating extractant to approximately 60° C. for injection of the extractant by the pump into the extractor tank.

6. A system as recited in claim 5 further comprising a heater for heating the evaporator to a temperature of approximately 100° C. to vaporize the solvent in the extractant for a return of the solvent to the source of the liquid extractant.

7. A system as recited in claim 1 wherein the extractant comprises:
a liquid hydrophobic component; and
a liquid hydrophilic component, wherein the hydrophilic component is combined with the hydrophobic component to create an azeotropic composition for dissolving and extracting bitumen from an oil sand, wherein the oil sand is selected from a group including oil wet sand and water wet sand.

8. A system as recited in claim 7 wherein the azeotropic composition has a boiling point of approximately 65° C., wherein the boiling point of the hydrophobic component is less than 60° C. and the boiling point of the hydrophilic component is less than 80° C.

9. A system as recited in claim 7 wherein the extractant further comprises an additive, wherein the additive is a solid aromatic compound and is added to the composition to prevent precipitation of the bitumen from the composition, and to increase the speed of extraction of the bitumen from the oil sand.

10. A system for creating a fluidized bed to separate bitumen from oil sand which comprises:

a means for crushing the oil sand;

a chamber having a first end and a second end;

a plurality of jet injectors mounted onto the chamber adjacent the second end thereof for directing a respective plurality of jet streams of a solvent into the chamber to establish a spiral velocity for the jet streams of solvent in the chamber to collectively create the fluidized bed between the let injectors and the first end of the chamber;

an intake port located at the first end of the chamber for introducing an input consisting of the crushed oil sand directly into the chamber for suspension of the crushed oil sand on the fluidized bed in the chamber, for reaction of the oil sand with the solvent of the fluidized bed to separate the bitumen from the oil sand;

an outlet port located at the second end of the chamber for removing sand from the chamber, wherein the removed sand has been substantially depleted of bitumen; and a recovery port located at the first end of the chamber for receiving bitumen and solvent from the chamber.

11. A system as recited in claim 10 further comprising a computer with a computer program for controlling the plurality of jet injectors to maintain a predetermined level for the fluidized bed in the chamber.

12. A system as recited in claim 10 further comprising:
an evaporator connected in fluid communication with the recovery port for evaporating the solvent into a solvent vapor; and
a distillation column connected to the evaporator for separating the solvent vapor from the bitumen.

13. A system as recited in claim 10 further comprising a vibratory centrifuge connected to the outlet port for receiving bitumen-depleted sand being recovered from the chamber, and for removing solvent from the depleted sand.

* * * * *

UNITED STATES PATENT AND TRADEMARK OFFICE
CERTIFICATE OF CORRECTION

PATENT NO. : 9,884,997 B2
APPLICATION NO. : 13/627518
DATED : February 6, 2018
INVENTOR(S) : Vladimir Y. Podlipskiy Page 1 of 1

It is certified that error appears in the above-identified patent and that said Letters Patent is hereby corrected as shown below:

In the Specification

Column 5, Line 17 - after the number "86" and before the word "can" INSERT -- that --.

Column 5, Line 41 - after the word "very" and before the word "the" DELETE "neat" and INSERT -- near --.

Column 5, Line 49 - after the word "produced" and before the word "a" DELETE "have" and INSERT -- having --.

In the Claims

Column 8, Line 25 - after the word "the" and before the word "injectors" DELETE "let" and INSERT -- jet --.

Signed and Sealed this
Tenth Day of July, 2018

Andrei Iancu
*Director of the United States Patent and Trademark Office*